Jan. 10, 1956

A. L. ELLIS 2,730,272

MEASURING AND DISPENSING TOP

Filed Nov. 30, 1950

INVENTOR.
A. LEIGHTON ELLIS
BY

ATTORNEY

United States Patent Office 2,730,272
Patented Jan. 10, 1956

2,730,272

MEASURING AND DISPENSING TOP

Alfred Leighton Ellis, Atlanta, Ga.

Application November 30, 1950, Serial No. 198,379

4 Claims. (Cl. 222—362)

My invention relates to a measuring and dispensing top particularly adaptable for use on the well known glass sugar container found in restaurants and the like.

Many styles and shapes of the present invention are known to the prior art yet none have found success as a marketable product in that the necessarily small and complicated component parts have proven a hindrance to the actual flow of the sugar from the container rather than a help in the dispensing thereof. Many of the devices are quite complicated and form blind pockets or chambers which soon become caked with sugar and present a difficult cleaning problem. The cost of manufacture of the numerous parts of most of the prior art dispensers more than offsets the advantages that they give to the public, hence they are rejected by the buyers of this type merchandise.

The most common beverages sold by cafes and the like which require sugar are, of course, coffee and tea, the amount of sugar used, if any at all, varying with the taste of the customer. It has been found, however, that the average tea or coffee drinker uses between one and two teaspoons full of sugar per cup or glass, a little more or less sugar not producing any noticeable difference in taste.

It is an object of the present invention to provide a sugar measuring and dispensing top for the common sugar container which, when tilted to the pouring position, may be made to measure and dispense one teaspoonful of sugar, and which by manipulation of a convenient lever may be made to measure and dispense as many teaspoonfuls of sugar as desired.

Another object of the invention is to provide a sugar measuring and dispensing top which is simple in its manufacture and because of the minimum number of component parts is easily cleaned.

Further objects and advantages of the invention will become apparent in the course of the following detailed description when viewed together with the accompanying drawing in which.

Figure 4:
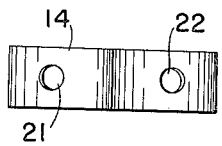
Fig. 4 is an end view of the element shown in Fig. 2.

In the drawing, numeral 10 designates the cap generally which consists of thin metallic material formed into a hollow shell having threads 11 rolled in the side walls of a size conforming to the conventional sugar container. As shown in the drawing, a portion of the conventional cone-shaped top 12 is pressed to form an arcuate pocket 13 adapted to receive the measuring element designated generally by the numeral 14 and shown in Figs. 2 and 4.

Figure 1:
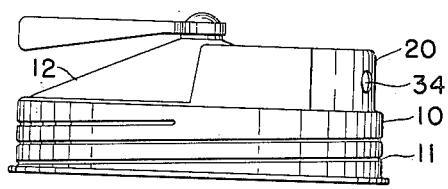
Fig. 1 is a side elevational view of an embodiment of my invention in a measuring and dispensing top.
Figure 2:
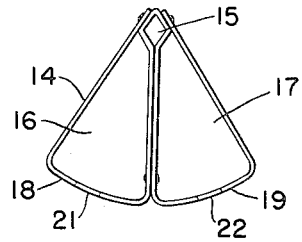
Fig. 2 is a plan view of a rotatable measuring element disposed within the top.

The measuring element 14 consists of a single metal strip slightly less in width than the height of the pocket 13 in which it is fitted and made into the shape as shown in Fig. 2. The strip is bent upon itself at its exact center so as to form a slightly distorted square hole 15. When the hole is completed the two portions of the strips are then spot welded, or otherwise fastened, and extend outwardly for a distance approximating the radius of the arcuate pocket 13, whereupon they are fastened again and are separated to form two triangular-shaped openings 16 and 17 with the ends finally being brought back to the sides of the hole 15 where they are fastened again. When two side walls are supplied to these two areas 16 and 17, as will be recited later in this description, each of the areas will hold a teaspoon of sugar. The outer rim portions 18 and 19 of each of the triangular-shaped areas 16 and 17 are formed to a radius slightly less than the inside of the rim portion 20 of the arcuate pocket 13. Through the rims 18 and 19 of the measuring element 14 I have provided holes 21 and 22, respectively, for the dispensing of the sugar measured by each confining area 16 and 17.

Figure 5:
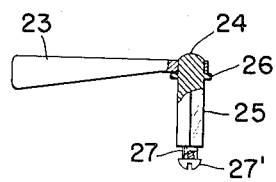
Fig. 5 is an elevational view, partly in cross-section, of a handle means used to move the element of Fig. 2.

Fig. 5 shows a handle assembly consisting of a lever 23 having one end drilled and soldered to the head 24 of a pin 25. While the head 24 is round and provided with a suitable shoulder 26 for receiving the lever 23, it will be noted that the lower portion of the stem 25 beneath the shoulder 26 is of square material with only the lower extremity 27 being round and serving as a bearing when the stem is turned by the handle. A stud screw 27' placed in the lower end of the pin 25 has an enlarged head which prevents the pin from working up.

Figure 7:
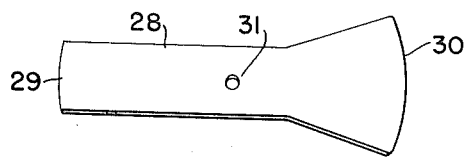
Fig. 7 is a perspective view of a separating member which forms a false bottom for the measuring element.

Fig. 7 shows a paddle-shaped metal strip 28 with each of its ends 29 and 30 turned to a radius slightly less than the radius of the inside of the bottom of the cap 10. This metal strip actually constitutes a false bottom for the dispensing element 14 and is provided with a central hole 31 serving as a bearing guide for the bottom end 27 of the handle assembly.

Figure 3:
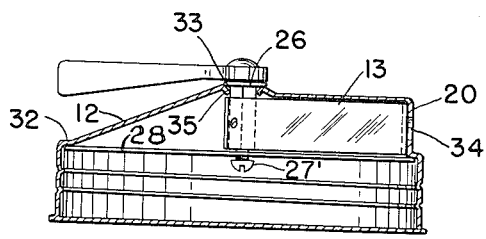
Fig. 3 is a cross-sectional view of the top proper showing the element of Fig. 2 in an operative position.

In Fig. 3 it will be noted that I have provided a definite shoulder 32 at the top of the threaded side walls of the cap 10 at the point of junction with the cone-shaped top 12.

To assemble the device, the stem 25 of the handle assembly is forced through a prepared hole 33 in the top center of the cone 12. The measuring element 14 is then started into the pocket 13 and the stem 25 is also forced through the distorted hole 15 of the measuring element. As the stem enters this hole 15, the thin strips yield only enough to admit the square stem yet furnish considerable resistance to being withdrawn therefrom. The bearing plate 28 is then fitted against the shoulder 32 with the ends thereof spot welded, or otherwise fastened, to the cap proper and with the lower end 27 of the stem 25 being slidably received in the hole 31. It will be noted that one end 30 of the bearing strip 28 is more or less fan-shaped and is made of a sufficient width to serve as a single bottom for one of the areas 16 or 17 of the measuring element 14. When fastened to the cap, the longitudinal axis of the strip 28 lies in the same plane with the fixed dispensing hole 34 positioned through the rim portion 20 of the pocket 13.

Figure 6:
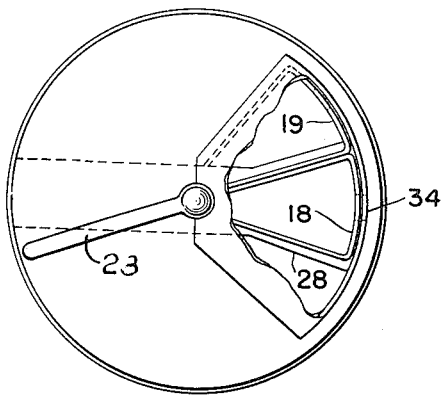
Fig. 6 is a broken top view.

In the broken top view as illustrated in Fig. 6, it can now be seen that when the lever 23 is moved in one direction of rotation one of the holes 21 of the measuring element 14 is made to register with the cap dispensing hole 34 and when moved in the opposite direction will bring the other hole 22 of the measuring element into register with the hole 34. It will be further noted that the length of the arcuate pocket is so made that each end forms a stop for the measuring element 14 so that in either of the two extreme positions one of its two holes is made to register exactly with the hole 34 in the cap.

It can also be seen in Fig. 6 that the bearing strip 28 forms a bottom for only one of the areas 16 or 17 while the top is furnished by the top of the pocket 13. Thus when one teaspoon of sugar is brought into this confined area for dispensing, the other area is free to be filled and no shaking or movement of other levers is required.

The hole 33 at the top center of the cap 10 is made with depending lip or rim 35, the upper edge of which is fitted snugly against the lower edge of the shoulder 26 on the stem 25 to prevent sugar from being wasted or spilled through the hole.

From the above description it is apparent that the device is simple in its construction and operation and can be manufactured at a minimum of cost. It is not unduly heavy and cumbersome as prior art devices and may be readily cleaned. Adaptations and embodiments other than that shown can be made without departing from the scope of my invention as defined by the appended claims.

I claim:

1. In a device of the class described, a top member comprising a hollow shell having an arcuate pocket portion formed in one side thereof to receive a measuring element, a handle element having a shaft rotatably mounted centrally in said top member, a measuring element positioned in said pocket portion and secured to said handle element for movement therewith, said measuring element comprising two substantially triangular-shaped measuring compartments having arcuate walls complementary to said arcuate pocket portion, a narrow bearing plate extending radially across the top member beneath said measuring element, said shaft being journaled at one end in said bearing plate, said top member being provided with a dispensing opening in said arcuate pocket portion, said measuring element being provided with dispensing openings through said arcuate walls communicating respectively with said measuring compartments, said measuring element being movable by said handle element to bring the dispensing openings communicating with said measuring compartments selectively into registry with the dispensing opening in said top member, said bearing plate being constructed and arranged selectively to cover the measuring compartment in communication with the dispensing opening in registry with the dispensing opening in the top member and to uncover the other of said measuring compartments.

2. In a device of the class described, a top member comprising a hollow shell having a screw threaded side wall portion and being provided with an arcuate pocket portion formed in one side thereof to receive a measuring element, a handle element having a shaft rotatably mounted centrally in said top member, a measuring element positioned in said pocket portion and secured to said handle element for movement therewith, said measuring element comprising a strip of material bent centrally upon itself to form a hole surrounding said rectangular shaft, the end portions of said measuring element extending outwardly for a distance approximating the radius of the arcuate pocket and then being curved to form two measuring compartments having arcuate walls complementary to said arcuate pocket portion, a narrow bearing plate extending radially across the top member beneath said measuring element, said shaft journaled at one end in said bearing plate, said top member being provided with a dispensing opening in said arcuate pocket portion, said measuring element being provided with dispensing openings through said arcuate walls communicating respectively with said measuring compartments, said measuring element being movable by said handle element to bring the dispensing openings communicating with said measuring compartments selectively into registry with the dispensing opening in said top member, said bearing plate being constructed and arranged selectively to cover the measuring compartment in communication with the dispensing opening in registry with the dispensing opening in the top member and to uncover the other of said measuring compartments.

3. In a device of the class described, a top member comprising a hollow shell having a screw threaded side wall portion and being provided with an arcuate pocket portion formed in one side thereof to receive a measuring element, a handle element having a rectangular shaft rotatably mounted in said top member, a measuring element positioned in said pocket portion and secured to said handle element for movement therewith, said measuring element comprising a single strip of material bent centrally upon itself to form a rectangular hole surrounding said rectangular shaft, the end portions of said measuring element extending outwardly for a distance approximating the radius of the arcuate pocket and then being curved to form two substantially triangular-shaped measuring compartments having arcuate walls complementary to said arcuate pocket portion, a substantially fan shaped bearing plate extending across the top member beneath said measuring element, said shaft being journaled at one end in said bearing plate, said top member being provided with a dispensing opening in said arcuate pocket portion, said measuring element being provided with dispensing openings through said arcuate walls communicating respectively with said measuring compartments, said measuring element being movable by said handle element to bring the dispensing openings communicating with said measuring compartments selectively into registry with the dispensing opening in said top member, said bearing plate being constructed and arranged selectively to cover the measuring compartment in communication with the dispensing opening in registry with the dispensing opening in the top member and to uncover the other of said measuring compartments.

4. In a device of the class described, a top member comprising a hollow shell having an arcuate portion formed in one side thereof to receive a measuring element, a handle element having a shaft rotatably coaxially mounted in said top member, a measuring element positioned in said pocket portion and secured to said handle element for movement therewith, said measuring element comprising two measuring compartments, and a narrow bearing plate extending radially across the top member beneath said measuring element, said top member being provided with a dispensing opening, said measuring element being provided with dispensing openings communicating respectively with said measuring compartments, said measuring element being movable by said handle element to bring the dispensing opening communicating with said measuring compartments selectively into registry with the dispensing opening in said top member, said bearing plate being constructed and arranged to selectively cover only the measuring compartment in communication with the dispensing opening in registry with the dispensing opening in the top member, said bearing plate leaving uncovered substantially the rest of said top member.

References Cited in the file of this patent

UNITED STATES PATENTS

| | | |
|---|---|---|
| 1,238,182 | Nichols et al. | Aug. 28, 1917 |
| 1,473,187 | Kaefer | Nov. 6, 1923 |
| 2,006,019 | Holesworth | June 25, 1935 |
| 2,016,440 | Kaufman | Oct. 8, 1935 |
| 2,032,763 | Mostkoff | Mar. 3, 1936 |
| 2,259,017 | Bennett | Oct. 14, 1941 |
| 2,446,582 | Gopner | Aug. 10, 1948 |
| 2,526,349 | Grace | Oct. 17, 1950 |

FOREIGN PATENTS

| | | |
|---|---|---|
| 477,516 | Great Britain | Jan. 3, 1938 |